United States Patent [19]
Bradshaw et al.

[11] Patent Number: 5,751,674
[45] Date of Patent: May 12, 1998

[54] APPARATUS FOR CONTROLLING BIAS AMOUNT OF FOCUS ERROR SIGNAL

[75] Inventors: Alex Bradshaw; Takashi Sasaki; Yoshifumi Fujino; Yoshimichi Nishio; Tomoko Miyagawa; Mayumi Takahashi; Hideaki Yoshimura, all of Kawagoe, Japan

[73] Assignee: Pioneer Electronic Corporation, Japan

[21] Appl. No.: 772,265

[22] Filed: Dec. 23, 1996

[30] Foreign Application Priority Data

Dec. 26, 1995 [JP] Japan ..................... 7-339783
Aug. 27, 1996 [JP] Japan ..................... 8-225282

[51] Int. Cl.$^6$ ........................................ G11B 7/09
[52] U.S. Cl. ..................... 369/44.35; 369/44.29; 369/44.25
[58] Field of Search .................. 369/44.29, 44.35, 369/44.36, 54, 44.25

[56] References Cited

U.S. PATENT DOCUMENTS

| | | | |
|---|---|---|---|
| 5,010,538 | 4/1991 | Takeda et al. | 369/44.36 |
| 5,109,367 | 4/1992 | Yoshikawa | 369/44.25 |
| 5,363,357 | 11/1994 | Niwayama | 369/44.25 |
| 5,475,664 | 12/1995 | Shimizume et al. | 369/44.29 |
| 5,600,615 | 2/1997 | Kiyoura et al. | 369/44.35 |
| 5,610,886 | 3/1997 | Hayashi et al. | 369/44.29 |
| 5,642,340 | 6/1997 | Nomura | 369/44.25 |

FOREIGN PATENT DOCUMENTS

363136323 A  6/1988  Japan .

Primary Examiner—Thang V. Tran
Attorney, Agent, or Firm—Nixon & Vanderhye

[57] ABSTRACT

An optical information reproducing and/or recording system is provided with an optical system for irradiating a light beam to an information record surface of an information record medium and detecting the light beam reflected from the information record surface to output a light detection signal, an amplifying device for amplifying the light detection signal and generating a focus error signal which indicates an error of a focus point of the light beam with respect to the information record surface, and a feed back device for feeding back the focus error signal in the focus servo loop to change the focus point in accordance with a level of the focus error signal. An apparatus for controlling a bias amount of the focus error signal is provided with: a superimposing device for superimposing a disturbance signal to flutter the focus point with respect to the information record surface, onto the focus error signal; an error amount detecting device for detecting a focus error amount of the focus point, on the basis of the light detection signal outputted when the disturbance signal is superimposed; a parameter calculating device for calculating a gain parameter corresponding to an amplification factor of the amplifying device, and a sensitivity parameter corresponding to a detection sensitivity of the optical system; and a bias amount calculating device for calculating the bias amount.

8 Claims, 9 Drawing Sheets

RELATIONSHIP BETWEEN
ERROR AMOUNT AND ERROR VOLTAGE

RELATIONSHIP BETWEEN FOCUS ERROR SIGNAL
AND THE VALUE OF ($G_0 \times G_5$)

APPARATUS FOR CONTROLLING BIAS AMOUNT OF FOCUS ERROR SIGNAL

BACKGROUND OF THE INVENTION

1. Field of the Invention

The present invention is related with an apparatus for controlling a bias amount from a standard level of a focus error signal used in a focus servo control in order to match a focus point of a light beam for recording and reproducing information with a position of an information record surface on an information record medium.

2. Description of the Related Art

In a case of optically reproducing information recorded on an information record medium such as an optical disk or the like, it is necessary to focus, with respect to an information record surface on which the information is recorded, a tight beam for reproducing the information in an optimum focus length, and to make an irradiation position (i.e. a light spot) of the light beam follow an information track, which is formed on the optical disk and on which the information is recorded.

At this time, in a case of a conventional optical disk reproducing apparatus, in order to focus the light beam on the information record surface, a focus servo control is performed which uses a focus error signal generated by a light reflected from the optical disk of the light beam. In order to make the light spot follow the movement of the information track, a tracking servo control is performed which uses a tracking error signal generated similarly by the light reflected from the optical disk of the light beam.

Among them, as the method of performing the focus servo control, a so called astigmatism method and a so called Foucault method are used up to now. In both of these methods, a so-called S curve is obtained on the basis of the reflection light of the light beam, as a focus error signal Sfe, as shown in an upper graph of FIG. 9. Then, a focus point of the light beam is matched with the position of the information record surface by moving an objective lens in a direction perpendicular to the information record surface by using an actuator or the like so that the focus error signal Sfe becomes [0] when a servo loop in the focus servo control is closed for this S curve (focus error signal Sfe).

Here, for example, in a case of the focus servo control using the astigmatism method, the S curve shown in FIG. 9 is obtained by receiving the reflection light of the light beam, to which the astigmatism is given, by using a four-division optical detector, adding detection signals of light-receiving elements located on diagonal lines respectively within the four-division optical detector and calculating a difference between the added signals, and has an output corresponding to an error amount of the focus point from the position of the information record surface.

Incidentally, in the actual optical disk reproducing apparatus, a difference between sensitivities of the respective light-receiving elements four-divided in the four-division optical detector (although all the sensitivities should be identical to each other, they may be different because of aging and the like), initial (manufacturing) adjustment errors for optical systems (an optical detector, a beam splitter, a quarter wave length plate and the like which are not shown) included in the optical disk reproducing apparatus and the like, cause an output of the focus error signal Sfe not to be [0], even if the information record surface and the focus point of the light beam actually coincide with each other (corresponding to the point where the error amount is [0] in FIG. 9).

The initial adjustments for the optical systems here mean the adjustments of optical axes, angles or the like of respective components in the optical systems, upon manufacturing the optical disk reproducing apparatus in such a way that the reflection light becomes a true circle on a light-receiving surface of the optical detector for receiving the reflection light from the optical disk of the light beam when the focus point of the light beam coincides with the information record surface. In the actual optical disk reproducing apparatus, there are certain limits in accuracies thereof in the adjustments for this optical system. Thus, even if the information record surface and the focus point of the light beam coincide with each other (that is, in the lower graph of FIG. 9, an RF (Radio Frequency) signal Srf, which is an output signal from the optical detector, has the maximum level), there may be a case that the output of the focus error signal Sfe does not become [0].

The phenomenon that the output of the focus error signal Sfe does not become [0] even if the information record surface and the focus point of the light beam coincide with each other especially appears in a CD (Compact Disk) player for a vehicle and the like. In this case, since the accurate focus error signal Sfe corresponding to the RF signal cannot be obtained, it is impossible to perform the accurate focus servo control. This results in reduction of an S/N (Signal/Noise) ratio and the like. As a result, it is impossible to accurately reproduce the information.

Then, in a case that a shift of the S curve as shown in the upper graph of FIG. 9 (a deviation between the focus point and the position of the objective lens when a level of the S curve becomes [0] is generated, it is necessary to superimpose a correct bias voltage onto the S curve (focus error signal Sfe) so that the focus point (a position at which the RF signal has the maximum level) corresponds to the position of the objective lens at which the level of the S curve becomes [0], as shown in FIG. 9.

As a method of determining a value of this bias voltage, the value of the bias voltage is determined by superimposing an external disturbance signal such as a sine wave signal having a predetermined period and the like onto the focus error signal, so as to intentionally flutter the focus point of the light beam in a direction perpendicular to the information record surface, observing the RF signal outputted by the optical detector at this time by using an oscilloscope and the like, and then adjusting the changing width of the output to become the minimum.

In the above technique, when determining the value of the bias voltage, it is generally adjusted by a person who operates the oscillator and the like. That is, when determining the value of the bias voltage at a time of manufacturing the optical disk reproducing apparatus, it is generally adjusted by a manufacturer and the like at-that time, or it is generally again adjusted by a repairer and the like, in a case of doing in the course of the utilization.

Therefore, in any event, there are problems that a certain time is required for the adjustment and that the user cannot use the optical disk reproducing apparatus during the adjustment.

Further, there may be a possibility that an adjusting amount is different on the basis of an adjuster. This results in a problem that the undesired variation is brought about in a focus servo control characteristic after the adjustment.

Moreover, the above mentioned adjustment is done by using a standard disk dedicated for the adjustment. This results in a problem that the bias voltage may be again incorrect at a time of actually reproducing the optical disk, even if the bias voltage is correct at a stage of the adjustment, because of a difference between characteristics of this standard disk and the actually reproduced optical disk (e.g. a difference between reflectance factors).

SUMMARY OF THE INVENTION

It is therefore an object of the present invention to provide an apparatus for controlling a bias amount of a focus error signal, which can automatically adjust the bias amount of the focus error signal in a short time and can control a bias voltage in correspondence with a factor, which has an influence on a value of the bias voltage and is peculiar to the individual optical disk to be actually reproduced.

The above object of the present invention can be achieved by an apparatus for controlling a bias amount of a focus error signal in a focus servo loop of an optical information reproducing and/or recording system. The optical information reproducing and/or recording system is provided with an optical system for irradiating a light beam to an information record surface of an information record medium and detecting the light beam reflected from the information record surface to output a light detection signal, an amplifying device for amplifying the light detection signal and generating the focus error signal which indicates an error of a focus point of the light beam with respect to the information record surface on the basis of the light detection signal, and a feed back device for feeding back the focus error signal in the focus servo loop to change the Focus point with respect to the information record surface in accordance with a level of the focus error signal. The bias amount controlling apparatus is provided with: a superimposing device for superimposing a disturbance signal to flutter the focus point with respect to the information record surface, onto the focus error signal; an error amount detecting device for detecting a focus error amount of the focus point with respect to the information record surface, on the basis of the light detection signal outputted when the disturbance signal is superimposed; a parameter calculating device for calculating a gain parameter corresponding to an amplification factor of the amplifying device, and a sensitivity parameter corresponding to a detection sensitivity of the optical system; and a bias amount calculating device for calculating the bias amount, on the basis of the detected focus error amount and the calculated gain parameter and sensitivity parameter.

According to the bias amount controlling apparatus of the present invention, a disturbance signal to flutter the focus point with respect to the information record surface is superimposed onto the focus error signal by the superimposing device. Then, a focus error amount of the focus point with respect to the information record surface is detected, by the error amount detecting device, on the basis of the light detection signal outputted when the disturbance signal is superimposed. On the other hand, a gain parameter corresponding to an amplification factor of the amplifying device, and a sensitivity parameter corresponding to a detection sensitivity of the optical system, are calculated by the parameter calculating device. Finally, the bias amount is calculated, by the bias amount calculating device, on the basis of the detected focus error amount and the calculated gain parameter and sensitivity parameter. Consequently, the bias amount of the focus error signal can be automatically controlled and adjusted in a short time. Further, since the bias amount can be calculated in a condition where the focus servo loop is closed when the information is actually reproduced from the information record medium, a precise bias amount controlling operation in line with the characteristic of the individual information record medium to be actually reproduced can be performed.

In one aspect of the present invention, the error amount detecting device detects the focus error amount on the basis of an amplitude of the light detection signal outputted when the disturbance signal is superimposed.

According to this aspect, the focus error amount is detected by the error amount detecting device, on the basis of an amplitude of the light detection signal outputted when the disturbance signal is superimposed. Thus, it is possible to simplify the error amount detecting operation and to make the operation speedy.

In another aspect of the present invention, the gain parameter calculating device calculates a product of the gain parameter and the sensitivity parameter on the basis of an amplitude of the focus error signal in a focus search operation of the optical information reproducing and/or recording system.

According to this aspect, a product of the gain parameter and the sensitivity parameter is calculated by the gain parameter calculating device, on the basis of an amplitude of the focus error signal in a focus search operation of the optical information reproducing and/or recording system. Thus, it is possible to simplify the calculating operation of the gain parameter and the sensitivity parameter and to make the operation speedy.

In another aspect of the present invention, the parameter calculating device calculates a product of the gain parameter and the sensitivity parameter on the basis of a predetermined design standard value for a gain of the focus servo loop and a gain of the focus servo loop after an automatic gain controlling operation of the optical information reproducing and/or recording system.

According to this aspect, a product of the gain parameter and the sensitivity parameter is calculated by the parameter calculating device, on the basis of a predetermined design standard value for a gain of the focus servo loop and a gain of the focus servo loop after an automatic gain controlling operation of the optical information reproducing and/or recording system. Thus, it is possible to simplify the calculating operation of the gain parameter and the sensitivity parameter and to make the operation speedy. Especially, since the calculating operation of the product of the gain parameter and the sensitivity parameter can be performed in parallel to the automatic gain controlling operation, the total processing time of the information reproducing process can be reduced.

In another aspect of the present invention, the bias amount calculating device is provided with: an adjusting amount calculating device for calculating an adjusting amount to adjust the bias amount, on the basis of the detected focus error amount and the calculated gain parameter and sensitivity parameter; and an adding device for adding the calculated adjusting amount to the bias amount before calculating the adjusting amount so as to calculate a new bias amount.

According to this aspect, when a new bias amount is to be calculated by the bias amount calculating device, at first, an adjusting amount to adjust the bias amount is calculated by the adjusting amount calculating device, on the basis of the detected focus error amount and the calculated gain parameter and sensitivity parameter. Then, the calculated adjusting amount is added to the bias amount before calculating the adjusting amount, by the an adding device. Thus, it is possible to simplify the calculating operation of the bias amount and make the calculating operation faster, as compared with the case of calculating the bias amount itself from the beginning.

In this aspect of the present invention, the bias amount controlling apparatus may be further provided with a memory device for storing the calculated bias amount, the adding device adding the calculated adjusting amount to the bias amount stored in the memory device.

According to this aspect, the calculated bias amount is stored into the memory. Later on, for the next operation of the bias amount controlling apparatus, the calculated adjusting amount is added to the bias amount stored in the memory device. Thus, since the present bias amount is calculated on the basis of the previous bias amount obtained in the past, only the changing amount of the bias amount from the previous bias amount is necessary to be calculated. Consequently, it is possible to simplify the calculating operation of the bias amount and make the calculating operation faster. Further, since the bias amount is updated in the memory each time the information is reproduced from the information record medium, the accuracy of the bias amount control can be improved.

In another aspect of the present invention, the bias amount calculating device calculates the bias amount by a plural of times, and the error amount detecting device detects the focus error amount by $N_1$ ($N_1$: natural number not less than 2) times at a plurality of different positions on the information record surface, calculates the focus error amount to non-finally calculate the bias amount on the basis of the $N_1$ times detected focus error amounts, detects the focus error amount by $N_2$ ($N_2$: natural number, and $N_1 < N_2$) times at the plurality of different positions and calculates the focus error amount to finally calculate the bias amount on the basis of the $N_2$ times detected focus error amounts.

According to this aspect, on one hand, if the bias amount is to be non-finally calculated, the focus error amount is detected by the $N_1$ times ($N_1 < N_2$) at the plurality of different positions, and the focus error amount is calculated on the basis of these $N_1$ times detected focus error amounts, by the error amount detecting device. Then, the bias amount is calculated on the basis of this calculated focus error amount corresponding to the $N_1$ times. On the other hand, if the bias amount is to be finally calculated, the focus error amount is detected by the $N_2$ times ($N_1 < N_2$) at the plurality of different positions, and the focus error amount is calculated on the basis of these $N_2$ times detected focus error amounts, by the error amount detecting device. Then, the bias amount is calculated on the basis of this calculated focus error amount corresponding to the $N_2$ times. Thus, the accuracy of the calculated bias amount can be certainly improved since the calculation is based on a plurality of focus error amounts as the influence of the detection errors can be more or less reduced or canceled by the existence of the correct detection. Especially, the accuracy of the finally calculated bias amount can be certainly improved in accordance with the magnitude of the number N2, while the time required for the calculation is not unnecessary increased since the focus error detection is performed only by the N1 times for the bias amounts other than the final bias amount.

In this aspect of the present invention, the error amount detecting device may calculate the focus error amount to non-finally calculate the bias amount by averaging maximum and minimum values of the $N_1$ times detected focus error amounts, and may calculate the focus error amount to finally calculate the bias amount by averaging maximum and minimum values of the $N_2$ times detected focus error amounts. Thus, the accuracy of the calculated bias amount can be certainly improved since the calculation is based on the maximum and minimum values of the focus error amounts.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 6, which consist of FIGS. 6A and 6B, are diagrams for explaining an operation of detecting an error amount, wherein

DETAILED DESCRIPTION OF THE PREFERRED EMBODIMENT

An embodiment of the present invention is explained with reference to the drawings.

At first, a configuration of an optical disk reproducing apparatus having an apparatus for controlling a bias voltage of a focus error signal in accordance with this embodiment in order to control a bias voltage as a bias amount of the focus error signal is explained with reference to FIGS. 1 to 3. In the embodiment described below, it is defined that the focus error signal is generated by the astigmatism method.

At first, a whole configuration of the optical disk reproducing apparatus in accordance with this embodiment is explained with reference to FIG. 1.

Figure 1:
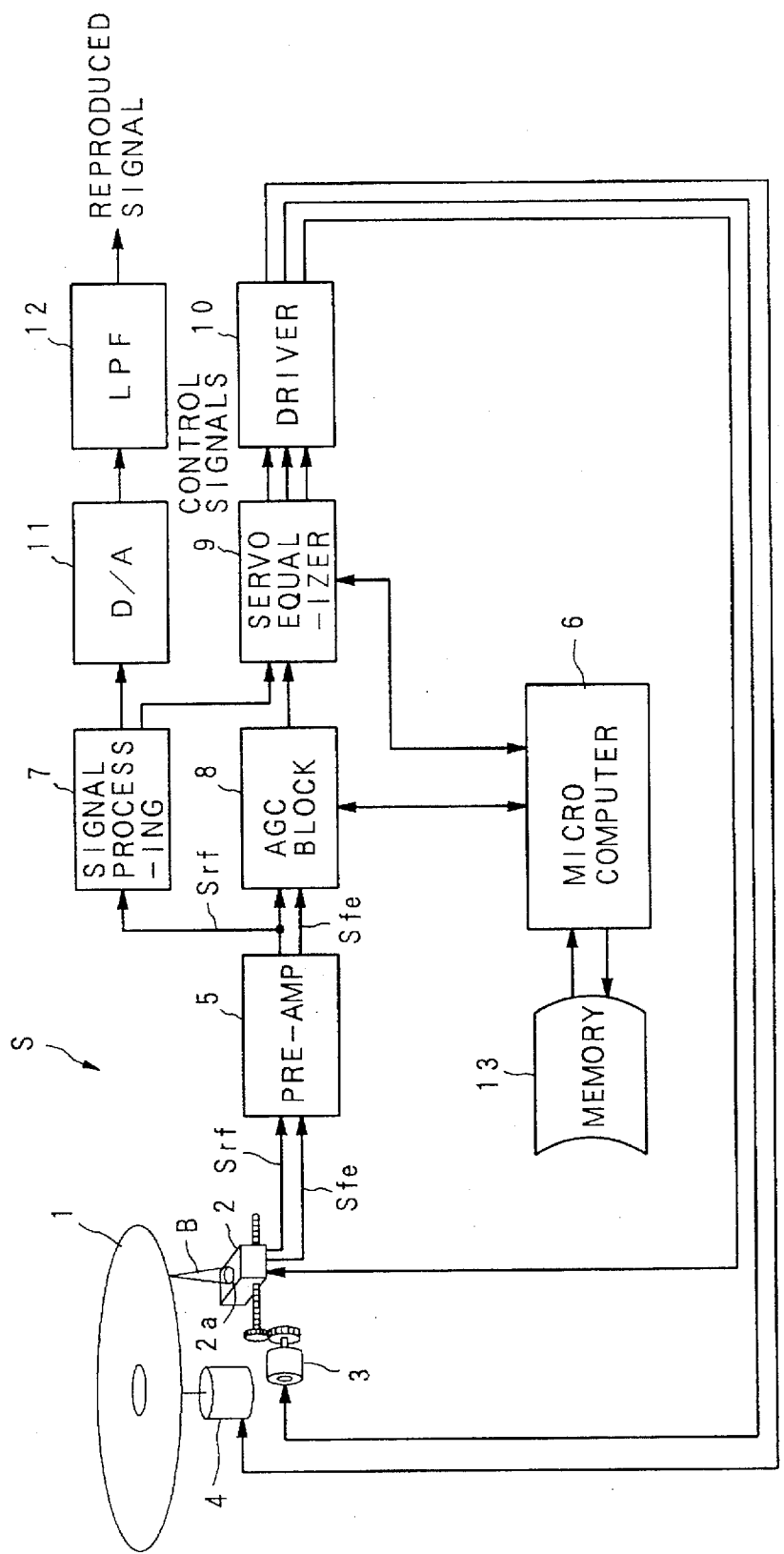
FIG. 1 is a block diagram showing a schematic configuration of an optical disk reproducing apparatus as an embodiment of the present invention.

As shown in FIG. 1, an optical disk reproducing apparatus S for reproducing information recorded on an optical disk 1 is provided with: an optical pickup 2 for irradiating a light beam B to the optical disk 1 and also receiving a reflection light thereof and outputting an electric signal (RF signal) Srf corresponding to the information recorded on the optical disk 1 and further outputting a focus error signal Sfe by means of the astigmatism method; a carriage motor 3 for moving the optical pickup 2 in a radial direction of the optical disk 1; a spindle motor 4 for rotating the optical disk 1 at a predetermined rotation speed; a pre-amplifier 5 for respectively amplifying the electric signal Srf and the focus error signal Sfe outputted by the optical pickup 2; a signal processing unit 7 for EFM (Eight to Fourteen Modulation) -demodulating the amplified electric signal Srf and also performing an error correction of it on the basis of an error correction code, such as a CIRC (Cross Interleave Reed- Solomon Code) and the like, and then outputting it to a D/A (Digital to Analog) converter 11 described later and a servo equalizer 9 described later; the D/A converter 11 for converting the electric signal Srf, which was demodulated and error-corrected, from a digital signal to an analog signal; an LPF (Low Pass Filter) 12 for passing a signal component within an audible frequency band of the electric signal Srf converted into the analog signals, so as to remove noise components, and outputting a reproduction signal such as an audio signal and the like; an automatic gain control (AGC) block 8 constituting the bias voltage controlling apparatus of this embodiment, for setting the bias voltage with respect to the amplified focus error signal Sfe and automatically controlling or adjusting a gain in a focus servo loop; the servo equalizer 9 for generating a control signal for the focus servo control on the basis of the electric signal Srf, which was demodulated and error-corrected, and the focus error signal Sfe, to which the bias voltage was set and applied, and further generating control signals for a tracking servo control, a spindle servo control and a carriage servo control; a driver 10 for amplifying and wave-shaping the control signals for the various servo controls outputted by the servo equalizer 9 and further outputting them to the spindle motor 4, the carriage motor 3 and a tracking control actuator and a focus servo control actuator (which are not shown) included in the optical pickup 2; a micro computer 6 for calculating the value of the bias voltage for the focus error signal and further controlling the optical disk reproducing apparatus S as a whole; and a memory 13 composed of a RAM (Random Access Memory) for example, for storing the value of the set bias voltage.

The optical pickup 2 is provided with: an objective lens 2a for condensing the light beam B onto the information record surface of the optical disk 1; an optical detector D (refer to FIG. 2) for receiving the reflection light of the light beam B from the optical disk 1 through the objective lens 2a; the focus servo control actuator (refer to FIG. 3) for driving the objective lens 2a in a direction perpendicular to the information record surface to thereby perform the focus servo control; the tracking servo control actuator (not shown) for driving the objective lens 2a in a direction parallel to the information record surface (and a direction orthogonal to an information track on which the information is recorded) to thereby perform the tracking servo control; and a semiconductor laser; a deflection beam splitter, a quarter wave length plate and the like (which are not shown) for outputting the light beam B.

Figure 2:
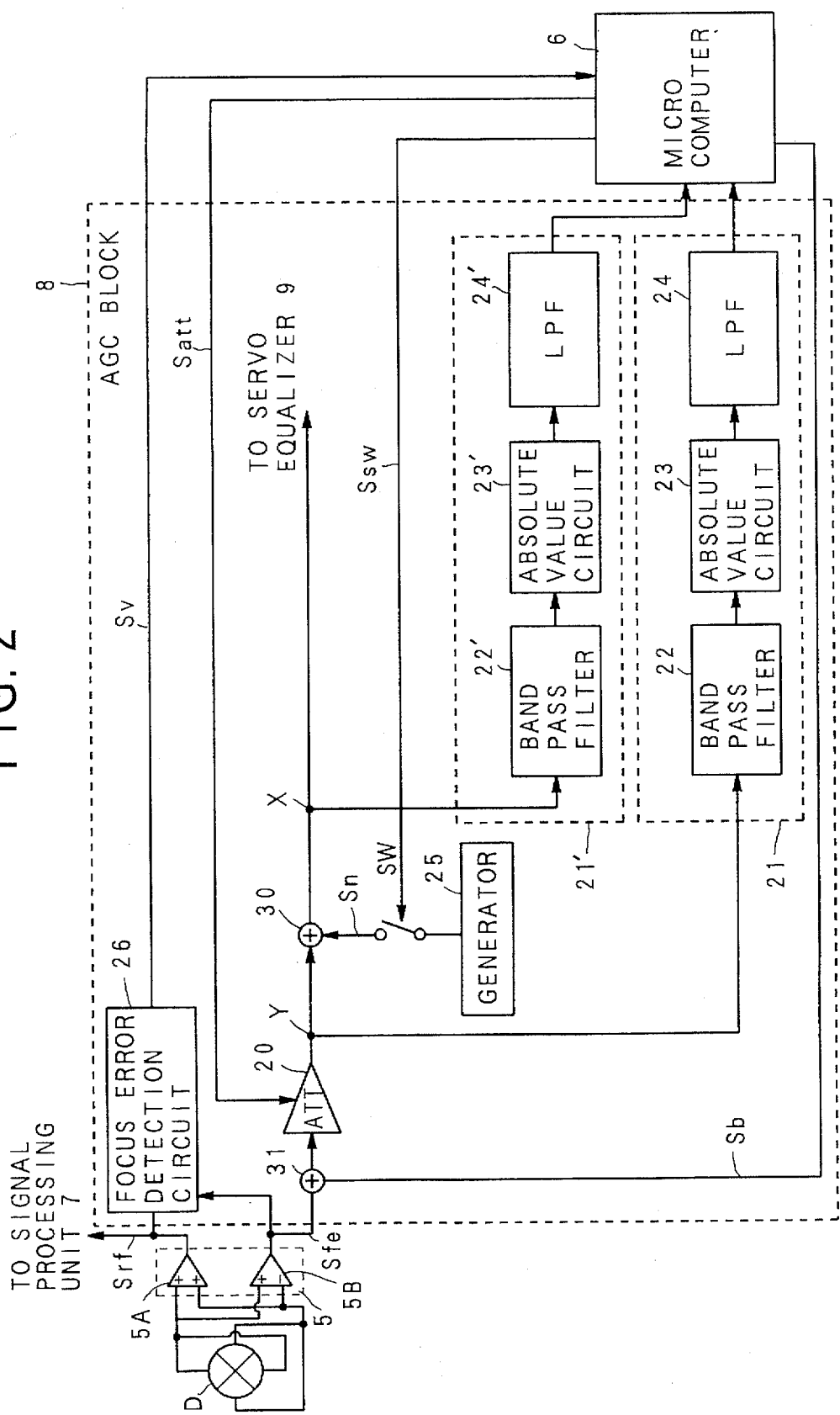
FIG. 2 is a block diagram showing a schematic configuration of an automatic gain control block and peripheral circuits thereof in the embodiment.

As shown in FIG. 2, the optical detector D is divided into four light-receiving elements, and adds outputs from all the light-receiving elements to thereby output the electric signal Srf. The optical detector D further adds detection signals of the light-receiving elements located on diagonal lines in the four-division detector respectively, and then calculates a difference between the added signals to thereby output the focus error signal Sfe.

Detailed configurations of the pre-amplifier 5 and the automatic gain control block 8 are explained with reference to FIG. 2. Incidentally, FIG. 2 shows the portions utilized for the focus servo control and the information reproduction among the portions related to the various servo controls and the information reproduction in the optical disk reproducing apparatus S. Since configurations related to the tracking servo, spindle servo and carriage servo controls are similar to those of the conventional art, illustrations thereof are omitted.

As shown in FIG. 2, the pre-amplifier 5 is provided with a pre-amplifier 5A for adding and amplifying the detection signals outputted by the respective light-receiving elements of the optical detector D to thereby output the electric signal Srf, and a pre-amplifier 5B for adding the detection signals of the light-receiving elements located on the diagonal lines of the optical detector D respectively and calculating and amplifying the difference between the added signals to thereby output the focus error signal Sfe.

Further, as shown in FIG. 2, the automatic gain control block 8 is provided with: a generator 25 for generating an external disturbance signal (for example, a sine wave signal having a frequency of 1 kHz) Sn to be superimposed onto the focus error signal Sfe in order to set the bias voltage; an adder 31 for superimposing a bias voltage on the basis of the bias control signal Sb from the micro computer 6, onto the focus error signal Sfe outputted by the pre-amplifier 5B; an attenuator 20 for changing and outputting a gain of the focus error signal Sfe to adjust the gain such that a loop gain in a focus servo loop described later has a predetermined design value for the focus error signal Sfe outputted by the adder 31 (for example, 0 dB at a frequency of 1 kHz and the like) on the basis of a gain control signal Satt from the micro computer 6; a gain change amount detecting unit 21 for detecting a gain change amount in the focus error signal Sfe, on the basis of one portion of the focus error signal Sfe branched from a Y branch (shown by a symbol Y in FIG. 2) provided within a route of the focus servo loop, among the whole portion of the focus error signal Sfe on which the disturbance signal Sn is superimposed and which has passed through one round of the focus servo loop described later (refer to FIG. 3); an adder 30 for superimposing the disturbance signal Sn generated by the generator 25 through a switch SW described later, onto the focus error signal Sfe passed through the Y branch; a gain change amount detecting unit 21' for detecting a gain change amount in the focus error signal Sfe immediately after the disturbance signal Sn is superimposed, on the basis of one portion of the focus error signal Sfe branched from a X branch (shown by a symbol X of FIG. 2) provided within the route of the focus servo loop, among the whole portion of the focus error signal Sfe outputted by the adder 30; the switch SW for controlling the superimposing process on the focus error signal Sfe of the disturbance signal Sn since it is opened and closed on the basis of a switch control signal Ssw from the micro computer 6; and a focus error detection circuit 26 for detecting an error amount from the information record surface of the focus point of the light beam B, on the basis of the electric signal Srf outputted by the pre-amplifier 5A and the focus error signal Sfe outputted by the pre-amplifier 5B, and outputting a corresponding error signal Sv.

The gain change amount detecting units 21 and 21' have the configurations similar to each other, and are respectively provided with band pass filters 22 and 22' for passing only a signal component having a frequency equal to that of the disturbance signal Sn, absolute value circuits 23 and 23' for rectifying output signals from the band pass filters 22 and 22' to thereby convert them into absolute value signals, and LPFs 24 and 24' for removing high frequency components from the respective absolute value signals to thereby change them into direct currents.

In the configuration of the automatic gain control block 8, the attenuator 20 and the gain change amount detecting units 21 and 21' are intended to perform an automatic gain control (AGC) in the focus servo loop. The concrete configurations and the detailed operations of these attenuator and the gain change amount detecting units are disclosed in, for example, Japanese Patent Application Laying Open (KOKAI) No. Hei. 7-130087, Japanese Patent Application Laying Open (KOKAI) No. Hei. 7-141029, Japanese Patent Application Laying Open (KOKAI) No. Hei. 7-141666 and the like. Thus, since they are well known in the technical field of the present invention, the explanations of the detailed portions thereof are omitted.

Before explaining a control operation for the bias voltage of the focus error signal Sfe in the optical disk reproducing apparatus S, a principle under which the error from the information record surface of the focus point of the light beam B can be controlled by controlling the bias voltage in the focus servo loop is explained with reference to FIG. 3. FIG. 3 shows a relationship between the respective elements constituting the focus servo loop (i.e., the pre-amplifier 5B, the adder 31, the attenuator 20, the servo equalizer 9, the driver 10, the focus servo control actuator 50 (hereafter, simply referred to as an "actuator") and the whole optical system 100 for outputting the electric signal Srf, which includes the optical detector D, the objective lens 2a, the deviation beam splitter, the quarter wave length plate, and so on in the configuration shown in FIGS. 1 and 2) as an automatic control system, and the respective control amounts and gains. In FIG. 3, a symbol [FE2] represents a control amount corresponding to the focus error signal Sfe outputted by the pre-amplifier 5B. A symbol [FE3] represents a control amount corresponding to the focus error signal Sfe to which the bias voltage (corresponding to a control amount shown by a symbol [B] in FIG. 3) outputted by the adder 31 is applied. A symbol [X] represents a control amount corresponding to a position in a direction perpendicular to the information record surface of the objective lens 2a by means of the operation of the actuator. And, a symbol [FE19 represents a control amount corresponding to the focus error signal Sfe outputted by the optical detector D.

Figure 3:
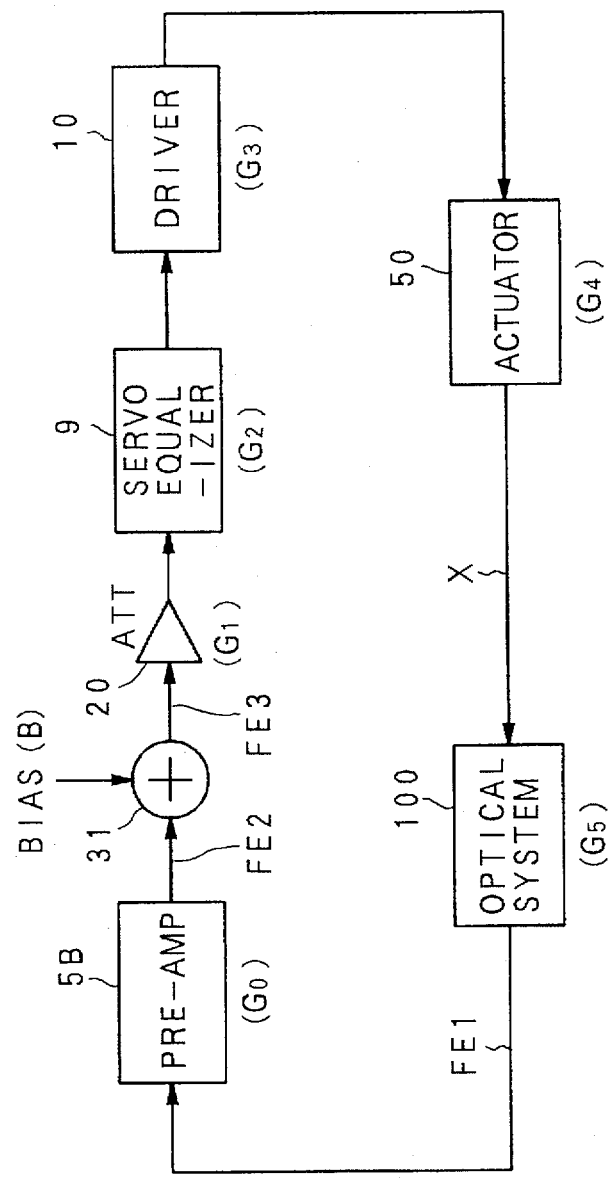
FIG. 3 is a schematic block diagram showing a configuration of a focus servo loop in the embodiment.

Further, in FIG. 3, it is assumed that the pre-amplifier 5B has a gain $G_0$ as a gain parameter, the attenuator 20 has a gain $G_1$, the servo equalizer 9 has a gain $G_2$, the driver 10 has a gain $G_3$, the actuator 50 has a gain $G_4$ and the whole optical system 100 has a gain $G_5$ as a sensitivity parameter. Here, the gain $G_5$ as for the whole optical system 100 indicates a total sensitivity gain of the optical detector D, the objective lens 2a, the deviation beam splitter, the quarter wave length plate and the like included in the optical system. As a result, the sensitivity gain $G_5$ includes gain components changed on the basis of the influence that variations of the reflectance factor of the actually reproduced optical disk I and the like have with respect to the focus error signal Sfe.

Among the respective gains, the gain $G_0$ of the pre-amplifier 5B, the gain $G_3$ of the driver 10 and the gain $G_5$ of the whole optical system 100 may be considered to be changed by the variation for each manufactured product, aging and the like. However, since the gain $G_3$ of the driver 10 among them is small in the change width (actually, equal to or less than ±2 dB), the gain $G_0$ of the pre-amplifier 5B and the gain $G_5$ of the whole optical system 100 may be considered to be predominantly changed by the variation for each product, the aging and the like. Among the optical elements included in the whole optical system 100, factors which have influence on the change of the gain $G_5$ are actually contamination onto a lens surface of the objective lens 2a, or slight displacement of the optical axis of each optical component due to vibration and the like.

A relationship between the respective control amounts and the respective gains in the focus servo loop shown in FIG. 3, can be evident from FIG. 3, as following equations (1) and (2).

$$FE3 = FE2 + B \qquad (1)$$

$$FE2 = FE3 \times (G_1 \times G_2 \times G_3 \times G_4 \times G_5 \times G_0) \qquad (2)$$

Assuming that an open loop gain is Gop when the focus servo loop shown in FIG. 3 is open, since $$Gop = G_1 \times G_2 \times G_3 \times G_4 \times G_5 \times G_0$$

Thus, from this equation and the equation (2), then:

$$FE2 = FE3 \times Gop \qquad (3)$$

And, from the equations (1) and (3), then:

$$FE2 = B \times Gop/(1 - Gop)$$

$$= B/(1/Gop - 1) \qquad (4)$$

Now, in a case of considering a direct current component (DC component) of the gain in the focus servo loop, since Gop>>1,
from this expression and the equation (4), then:
1/Gop≈0
At last, then:

$$FE2 = -B \qquad (5)$$

From the equation (5), if the bias voltage B is changed, the FE2 is changed. Further, from FIG. 3, then:

$$X = FE2/(G_5 \times G_0) \qquad (6)$$

Thus, if the FE2 is changed, a position X of the objective lens 2a is changed.

As can be evident from the above mentioned explanations, it is possible to control the bias voltage B in the focus servo loop to thereby control the error and position from the information record surface of the focus point of the light beam.

Incidentally, from the equations (5) and (6), then:

$$|B| = |X \times G_5 \times G_0| \qquad (7)$$

Thus, from the equation (7), if knowing the position of the objective lens 2a and the gains of the pre-amplifier 5B and the whole optical system 100 (i.e. the gains $G_0$ and $G_5$), it is possible to determine the bias voltage B. And, in a case of considering the position X of the objective lens 2a by displacing it to an error amount x from a predetermined standard position, the bias voltage B is shown below:

$$|B| = |x \times G_5 \times G_0| \qquad (8)$$

Thus, the bias voltage B shown in the above expression (8) indicates a changing amount (adjusting amount) from a predetermined standard bias voltage.

While taking account of a fact that the position X of the objective lens 2a can be controlled by changing the bias voltage B as mentioned above, and operations of the optical disk reproducing apparatus S having the configurations shown in FIGS. 1 and 2 is explained with reference to FIGS. 4 to 8 (mainly as for a process of setting the optimum bias voltage in the optical disk reproducing apparatus S). In the operations of the optical disk reproducing apparatus S described below, in parallel to a bias voltage calculating process of the focus error signal Sfe, the automatic gain control of the focus servo loop is performed by the attenuator 20 and the gain change amount detecting units 21 and 21'.

At first, a whole operation among the operations of the optical disk reproducing apparatus S is explained with reference to FIG. 4. The operations shown in FIGS. 4 and 5 are mainly performed under the control of the micro computer 6.

Figure 4:
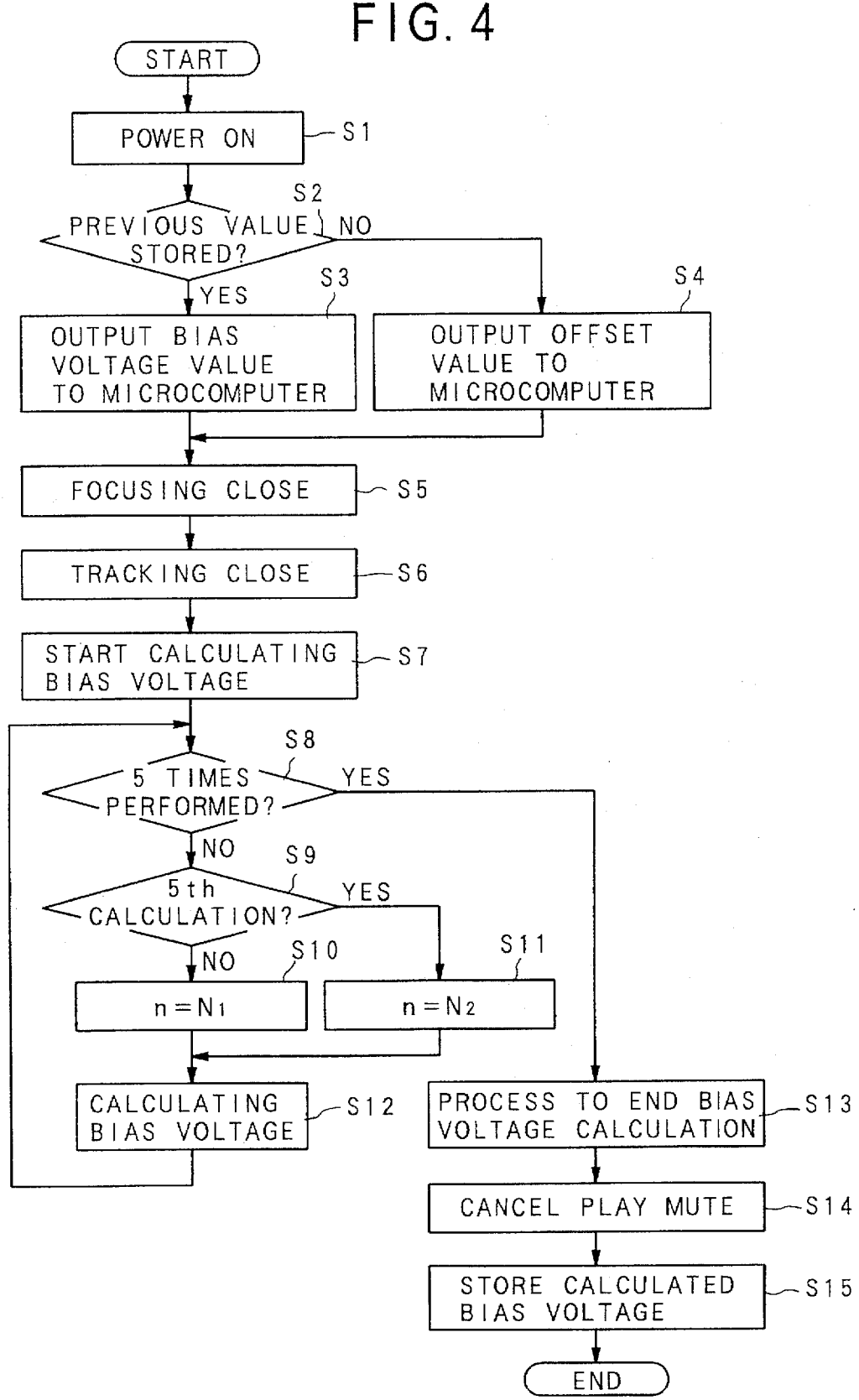
FIG. 4 is a flow chart showing a whole operation of the optical disk reproducing apparatus in the embodiment.
Figure 5:
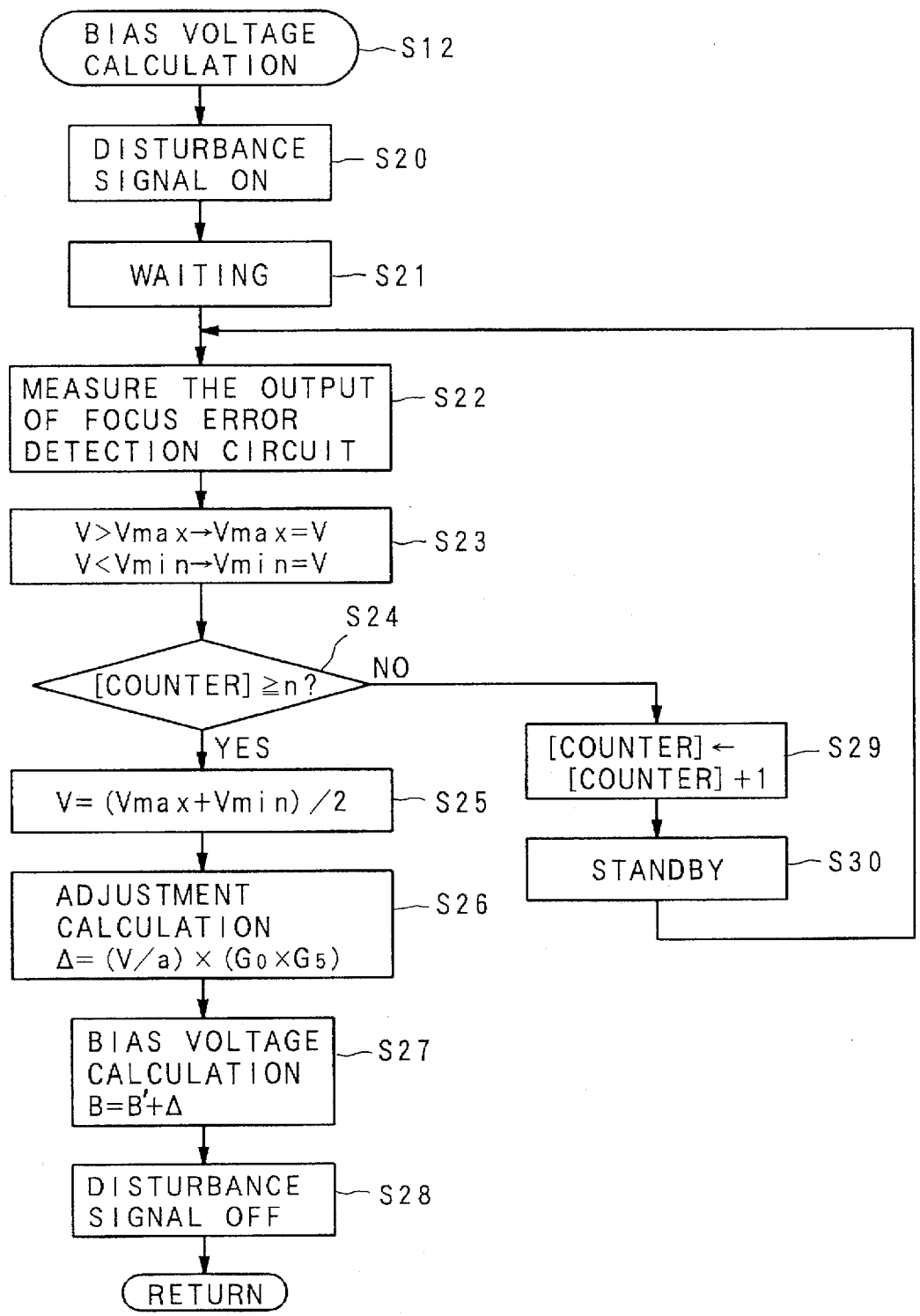
FIG. 5 is a flow chart showing operations at detailed portions of a bias voltage calculating process in the embodiment.

As shown in a flow chart of FIG. 4, in the optical disk reproducing apparatus S of this embodiment, when a power supply is firstly turned on (Step S1), it is judged whether or not a bias voltage set at a time of setting a previous bias voltage is stored in the memory 13 (Step S2). If stored (Step S2; YES), its value is outputted to the micro computer 6 (Step S3). On the other hand, if the previous bias voltage is not stored in the memory 13 (Step S2; NO), an electric offset value of the bias voltage set on the basis of the output signal from the pre-amplifier 5 before setting the bias voltage is outputted to the micro computer 6 (Step S4).

Next, in order to perform the focus servo control by rotating the optical disk 1 and focusing the light beam B on the information record surface of the optical disk 1, the focus servo loop shown in FIG. 3 is closed by the operation of the servo equalizer 9 under the control of the micro computer 6 (Step S5). Next, in order to perform the tracking servo control for making the light beam B follow on the information track of the micro computer 6, the tracking servo loop is closed by the operation of the servo equalizer 9 under the control of the micro computer 6 (Step S6).

After that, in order to perform the bias voltage calculating process in accordance with the present invention, various values necessary for the calculating process are set in the micro computer 6, the servo equalizer 9 and the like (Step S7).

Next, it is judged whether or not the adjustment of the bias voltage is performed five times (Step S8). This judgment is the process to set a final bias voltage after the same setting process (a step S12 described later) is repeated five times, in order to improve an accuracy of the set bias voltage.

If the bias voltage setting process is not performed five times (Step S8; NO), it is judged whether or not it is the fifth (final) bias voltage setting process (Step S9). If it is not the fifth (final) bias voltage setting process (Step S9; NO), a sample number n to be used at the bias voltage calculating process (Step S12) described later is set as n=$N_1$ to correspond to a sample position which is distributed within a distance less than one round in the optical disk 1 (Step S10) (at the step S12, in order to improve the calculating accuracy, the bias voltage is calculated on the basis of the error amount from the position of the information record surface of the focus point of the light beam B at a different position (hereafter, referred to as a "sample") on the optical disk 1).

On the other hand, if it is the fifth (final) bias voltage setting process in the process at the step S9 (Step S9; YES), the sample number n to be used in the bias voltage calculating process (Step S12) is set as n=$N_2$ (at this time, $N_1<N_2$) in order to detect the error amount at the sample position which is distributed within a distance equal to or more than the one round in the optical disk 1 (Step S11). Here, the $N_2$ samples are distributed at the distances equal to or more than the one round in the optical disk 1. When the sample number is set to the $N_2$ at the step S11, the error amount from the position of the information record surface of the focus point of the light beam B can be determined from the samples distributed at the distances equal to or more than the one round in the optical disk 1. Thus, it is possible to set the bias voltage in which the influence of a so-called surface distortion in the optical disk 1 (distortion over the optical disk 1) is considered.

After the sample number n is set at the step S10 or S11, the bias voltage calculating process in accordance with the present invention is performed (Step S12). Detailed portions of the bias voltage calculating process at the step S12 are described later.

After the bias voltage calculating process is performed at the step S12, the flow returns to the step S8 in order to repeat the bias voltage calculating process until five times.

On the other hand, if the bias voltage setting process is performed five times at the step S8 (Step S8; YES), processes required to end the bias voltage calculating process are performed in the servo equalizer 9, the micro computer 6 and the like (Step S13). Then, a play mute is canceled, and the electric signal Srf is outputted to the signal processing unit 7, and thereby the reproduction is started (Step S14). Further, the value of the bias voltage calculated by the processes at the steps S8 to S12 is stored into the memory 13 (Step S15) so as to prepare a next reproduction process, and then the process is ended.

The bias voltage calculating process at the step S12 in FIG. 4 is explained with reference to FIGS. 5 to 8.

In the bias voltage calculating process (Step S12) of the embodiment, the switch control signal Ssw is firstly outputted by the micro computer 6 to thereby control the switch SW to be closed, so as to superimpose the disturbance signal Sn through the adder 30 onto the focus error signal Sfe (Step S20). Then, after waiting for stabilization of the error signal Sv outputted by the focus error detection circuit 26 (Step S21), a value of the error signal Sv (error voltage V) is measured by the micro computer 6 (Step S22). At this time, the error signal Sv has the error voltage V corresponding to the error amount between the focus point of the light beam B at each sample position on the optical disk 1 and the information record surface of the optical disk 1. Detection of the error voltage V at the step S22 will be explained later with reference to FIGS. 6 and 7.

After the error voltage V corresponding to the error amount between the focus point of the light beam B and the information record surface of the optical disk 1 is measured on the basis of the error signal Sv from the focus error detection circuit 26 (Step S22), if the measured error voltage V is larger than the maximum value Vmax of the error voltages V detected in the previous measurements at the other sample positions, the currently measured error voltage V is stored as the maximum value Vmax. Further, if the measured error voltage V is smaller than the minimum voltage Vmin of the previously detected error voltages V at the other sample positions, the currently measured error voltage V is stored as the minimum value Vmin (Step S23). The process at the step S23 is a process of updating and storing the maximum value Vmax and the minimum value Vmin so as to calculate an average value between the maximum value and the minimum value at a later process (Step S25).

After the maximum value Vmax and the minimum value Vmin of the error voltages V are updated (Step S23), it is judged whether or not a value of a counter (included in the micro computer 6) for counting a detection number (detected sample number) of the error amounts (error voltages V) at one bias voltage calculating process is equal to or more than [$N_1$] or [$N_2$] indicating the total number of the samples (Step S24). If the value of the counter is equal to or more than the total number of the samples (Step S24; YES), in order to calculate the final error voltage V at the present bias voltage calculating process, the final error voltage V is determined from the maximum value Vmax and the minimum value Vmin of the previously stored error voltages V, as the average value thereof(Step S25).

By use of the error voltage V calculated at the step S25, an adjusting amount Δ of the bias voltage is calculated by the following equation.

$$\Delta = (V/a) \times (G_0 \times G_S) \qquad (9)$$

wherein $a$ is a constant coefficient (refer to FIG. 7) indicating a relationship between the error amount from the information record surface of the focus point of the light beam B and the error voltage V. The adjusting amount $\Delta$ at the equation (9) will be detailed later.

After the adjusting amount $\Delta$ of the bias voltage is calculated (Step S26), the value is added to a bias voltage B' up to that time and accordingly the final bias voltage B is obtained (Step S27). Then, it is outputted to the adder 31 as the bias control signal Sb and superimposed onto the focus error signal Sfe. When the switch control signal Ssw is outputted by the micro computer 6, the switch SW is opened, and thereby the superimposing process of the disturbance signal Sn on the focus error signal Sfe is stopped (Step S28). Then, the bias voltage calculating process is ended.

On the other hand, if the value of the counter is not equal to or more than the total number of the samples in the process at the step S24 (Step S24; NO), the value of the counter is incremented by [1] (Step S29). The operation is in a standby state (Step S30) while a light spot is moved to a next sample. The operation is returned to the step S22 in order to use the next sample to thereby detect the error voltage V.

The detection of the error amount at the step S22 is explained with reference to FIGS. 6A, 6B and 7.

Figures 6A, 6B:
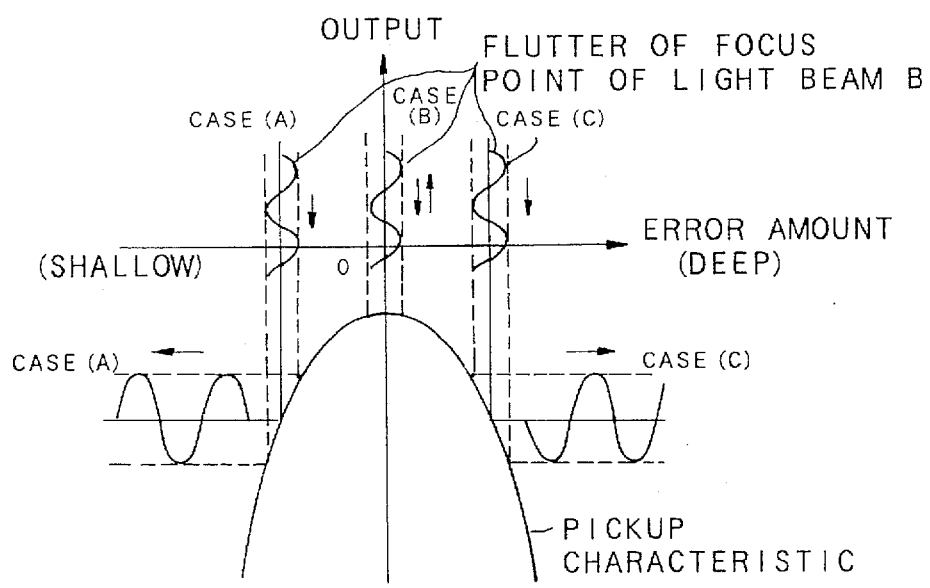
FIG. 6A is a diagram showing a relationship between a focus point and a position of an information record surface and wave forms of various signals.
FIG. 6B is a diagram showing a principle thereof.

As shown in FIG. 6A, when closing the focus servo loop (Step S5 in FIG. 4) and also closing the tracking servo loop (Step S6 in FIG. 4) and then superimposing the disturbance signal Sn onto the focus error signal Sfe (Step S20 in FIG. 5) to thereby perform the focus servo control, the objective lens 2a is vibrated in a direction perpendicular to an information record surface P at a distance (shown by a symbol $\lambda$ in FIG. 6A) and a period corresponding to an amplitude and a frequency of the superimposed disturbance signal Sn. At this time, the focus point of the light beam B is fluttered at a position shown in each cases (A) to (C) of FIG. 6A corresponding to the error amount between the focus point and the information record surface P. At this time, each of the electric signals Srf as a disturbance detection signal inputted to the focus error detection circuit 20 has a wave form as shown in FIG. 6A. That is, in a case (A) that the light beam B is focused ahead of the information record surface P (i.e., focused at a shallower position) because of the distortion of the bias voltage in the focus error signal Sfe, the electric signal Srf is changed in amplitude under the same phase as the disturbance signal Sn, and further the amplitude becomes higher. In a case (C) that the light beam B is focused at a deeper position than the information record surface P because of the distortion of the bias voltage in the focus error signal Sfe, the electric signal Srf is changed in amplitude under the phase opposite to that of the disturbance signal Sn, and further the amplitude becomes higher. Moreover, in a case (B) that the focus point of the light beam B substantially coincides with the position of the information record surface P, the electric signal Srf is changed in amplitude under a frequency two times the disturbance signal Sn, and further the amplitude (changed width of the electric signal Srf) becomes the minimum.

The reason why the frequency and the amplitude of the electric signal Srf are changed on the basis of the distance from the focus point of the light beam B to the information record surface P is explained with reference to FIG. 6B. A second order curve which is opened downward in FIG. 6B shows a mutual relationship between the distance from the focus point of the light beam B to the information record surface P as a horizontal axis in the optical pickup 2 and the strength of the corresponding electric signal Srf as a vertical axis.

As can be evident from FIG. 6B, in the case (A) that the focus point of the light beam B is located ahead of the information record surface P, when the focus point of the light beam B is fluttered at the period and the amplitude corresponding to the disturbance signal Sn, the wave form of the outputted electric signal Srf has the same phase as that of the disturbance signal Sn, and the amplitude thereof becomes higher. In the case (C) that the focus point of the light beam B is deeper than the information record surface P, when the focus point of the light beam B is fluttered at the period and the amplitude corresponding to the disturbance signal Sn, the wave form of the outputted electric signal Srf has the phase opposite to the disturbance signal Sn, and the amplitude thereof becomes higher. Moreover, in the case (B) that the focus point of the light beam B substantially coincides with the position of the information record surface P, the period of the detected electric signal Srf becomes two times the disturbance signal Sn, and the amplitude becomes the minimum.

Thus, by detecting the amplitude of the electric signal Srf when superimposing the disturbance signal Sn on the focus error signal Sfe by the focus error detection circuit 26, it is possible to determine the error amount x between the focus point of the light beam B and the position of the information record surface P. This results in the output of the error signal Sv having the error voltage V corresponding to the error amount x. Here, it is known that a relationship between the error amount x, between the focus point of the light beam B and the position of the information record surface P, and the corresponding error voltage V is changed in a form of a first order function as shown in FIG. 7.

Further, by comparing the phase of the electric signal Srf with that of the focus error signal Sfe (on which the disturbance signal Sn is superimposed) inputted to the focus error detection circuit 26, it is possible to judge whether or not the relationship between the focus point of the light beam B and the position of the information record surface P corresponds to the case (A) or the case (C) shown in FIG. 6A. This is outputted as a difference of a polarity of the error signal Sv.

The adjusting amount $\Delta$ calculated at the step S26 is explained.

The adjusting amount $\Delta$ is expressed by the equation (9).

$$\Delta = (V/a) \times (G_0 \times G_S) \qquad (9)$$

Figure 7:
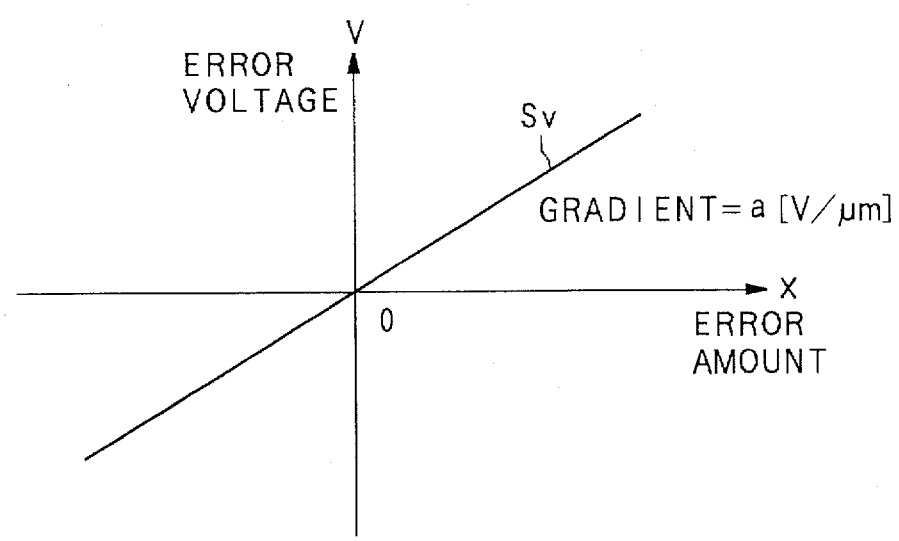
FIG. 7 is a graph showing a relationship between an error amount and an error voltage.

As shown in FIG. 7, there is a relationship between the error voltage V and the error amount x, between the focus point of the light beam B and the position of the information record surface, at the equation (9), as a following equation (10).

$$V = a \times x \qquad (10)$$

Thus, when the equation (8) is re-written by using the equation (10), the adjusting amount $\Delta$ is expressed in the following manner by the equation (9).

$$\Delta = x \times G_S \times G_0$$
$$= (V/a) \times (G_S \times G_0) \qquad (9)$$

Namely, it is concluded that the adjusting amount $\Delta$ is given by the equation (9).

Next, a method of actually calculating the adjusting amount $\Delta$ is explained.

At first, for the item (V/a) (i.e. the error amount x), as shown in FIGS. 6A, 6B and 7, the voltage (error voltage) V of the error signal Sv outputted by the focus error detection circuit 26 is detected by the micro computer 6. This is divided by the constant a (in other words, a sensitivity of the focus error detection circuit 26) which is known in advance from the relationship shown in FIG. 7, so that the adjusting amount Δ can be calculated.

The calculating process of the item ($G_5 \times G_0$) is explained. There are two methods of calculating the value ($G_5 \times G_0$), as shown below.

Figure 8:
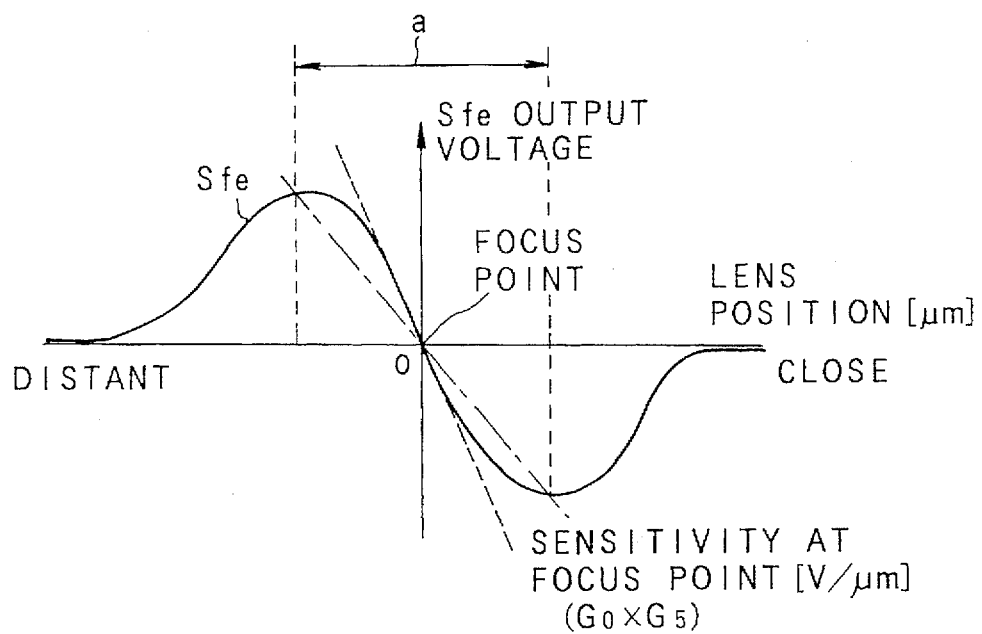
FIG. 8 is a graph showing a relationship between a focus error signal and a value of $(G_0 \times G_5)$.
Figure 9:
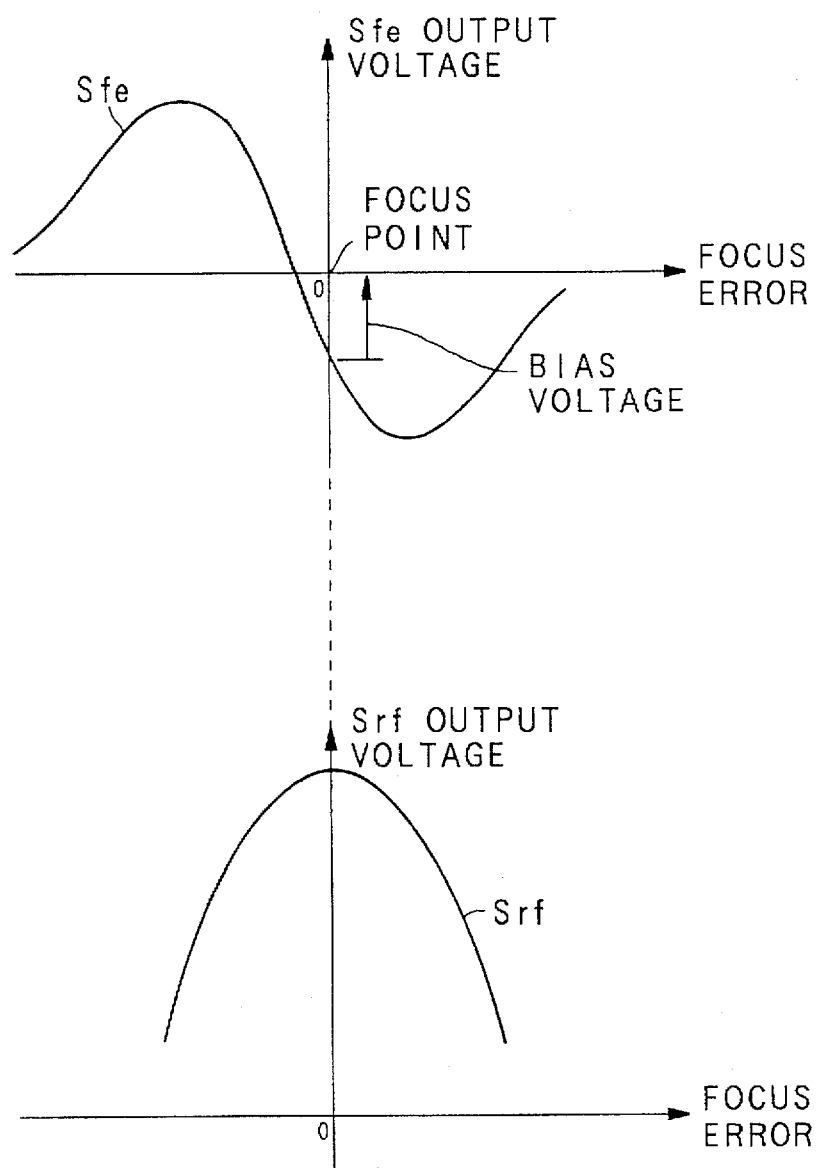
FIG. 9 are graphs showing a variation of the focus error signal.

(I) Method of Calculating on the Basis of the Focus Error Signal Sfe Generated in the Focus Search Operation At first, a method of calculating the value of the ($G_5 \times G_0$) (at a dimension of [V/m]) on the basis of the focus error signal Sfe generated in the focus search operation is explained with reference to FIG. 8. The focus search operation means an operation of setting a standard position of a focus point of a light beam in the focus servo control before performing the focus servo operation.

It is known that the sensitivity at the focus point of the focus error signal Sfe generated in the focus search operation (that is, a gradient of the focus error signal Sfe at the focus point) corresponds to the value ($G_5 \times G_0$).

On the other hand, the followings are also known. That is, a distance α that the objective lens 2a moves while two peak values (an upper peak value and a lower peak value) in the focus error signal Sfe shown in FIG. 8 are detected is constant in the optical system of the optical disk reproducing apparatus S. Further, a gradient of a straight line (shown by a dashed line in FIG. 8) connecting between the peak points corresponding to the two peak values in the focus error signal Sfe is proportional to the gradient of the focus error signal Sfe at the focus point.

Therefore, if measuring the amplitude (p—p value) of the focus error signal Sfe in the focus search operation, assuming that b is a proportional constant in the proportional relationship between the gradient of the straight line connecting between the peak points corresponding to the two peak values in the focus error signal Sfe and the gradient of the focus error signal Sfe at the focus point, the value ($G_5 \times G_0$) can be calculated as a following equation (11) as the gradient of the focus error signal Sfe at the focus point.

$$G_5 \times G_0 = ([\text{p-p Value of Focus Error Signal Sfe}]/\alpha) \times b \quad (11)$$

As a result, the value ($G_5 \times G_0$) can be calculated on the basis of the relation of the equation (11), by measuring in advance the relationship between the amplitude (p—p value) of the focus error signal Sfe and the value ($G_5 \times G_0$) at a time of manufacturing and the like to thereby determine the constants α and b, and by detecting the amplitude (p—p value) of the focus error signal Sfe later in the focus search operation.

(II) Method of Calculating on the Basis of the Automatically Controlled Gain

Next, a method of calculating the value ($G_5 \times G_0$) on the basis of an automatically controlled gain of the focus servo loop is explained.

As mentioned above, the variation of the gain $G_0$ of the pre-amplifier 5B in the focus servo loop shown in FIG. 3 may result from an initial adjustment deviation (at a time of manufacturing) in many cases. On the other hand, the variation of the gain $G_5$ of the whole optical system may sometimes result from the aging in addition to the initial adjustment deviation. Thus, it is considered that the variation of the gain when automatically adjusting the gain of the focus servo loop practically results from the gain $G_0$ of the pre-amplifier 5B and the gain $G_0$ of the whole optical system.

In a case of automatically adjusting the gain of the focus servo loop (AGC automatic adjustment), the attenuator 20 is controlled by the gain control signal Satt (refer to FIG. 2) from the micro computer 6, and thereby the gain $G_1$ shown in FIG. 3 is changed. Thus, to perform the AGC automatic adjustment by means of the AGC process such that the gain of the focus servo loop is constant is equivalent to making the value ($G_0 \times G_1 \times G_5$) constant as a result. Therefore, the following equation is established:

[Design Standard Value of Value $G_1$]/[Value $G_1$ After Automatic Adjustment]=[Present Value of ($G_0 \times G_5$)]/[Design Standard Value of Value ($G_0 \times G_5$)]  (12)

From the equation (12), then:

[Present Value of ($G_0 \times G_5$)]=([Design Standard Value of Value $G_1$]/[Value $G_1$ After Automatic Adjustment])×[Design Standard Value of Value ($G_0 \times G_5$)]  (13)

The design standard value is a standard value with respect to the design set when manufacturing the optical disk reproducing apparatus S. Once this standard value is set, it is stored in the micro computer 6, and never changed or updated after that.

The present value of the ($G_0 \times G_5$) can be determined from the value of the gain $G_1$ after the AGC automatic adjustment, on the basis of the design standard value of the value of the gain $G_1$ and the design standard value of the value ($G_0 \times G_5$) which are stored, from the equation (13).

In a case of comparing the methods shown in (I) and (II) with each other, since the method shown in (I) calculates the value ($G_0 \times G_5$) from the S curve, it can simplify the calculating process. However, it requires a time to measure the S curve. In contrast with this, if the method shown in (II) calculates the bias voltage in parallel to performing the AGC automatic adjustment, it can use the result of the AGC automatic adjustment to calculate the value ($G_0 \times G_5$). Therefore, the process can be performed faster in the method shown in (II).

Since the value (V/a) and the value ($G_0 \times G_5$) can be calculated by the above mentioned respective methods, from these values it is possible to calculate the adjusting amount Δ at the step S26. After that, it is possible to finally calculate the bias voltage at the step S27.

As explained above, according to the process of the bias voltage controlling apparatus of the focus error signal Sfe in the embodiment, the bias voltage is calculated on the basis of the error amount x between the focus point of the light beam B when the disturbance signal Sn is superimposed and the position of the information record surface, the gain $G_0$ of the pre-amplifier 5B in the focus servo loop and the gain (sensitivity) $G_5$ in the whole optical system. As a result, it is possible to perform the bias voltage control in the focus error signal Sfe automatically in a short time.

When actually reproducing the information from the optical disk 1, the bias voltage can be calculated in a condition that the focus servo loop is closed. As a result, it is possible to accurately perform the bias voltage control corresponding to the characteristic of the optical disk 1.

Further, since the focus error detection circuit 26 detects the error amount x on the basis of the amplitude of the electric signal Srf when the disturbance signal Sn is superimposed, it is possible to simplify the detecting process of the error amount and also possible to make the process faster.

Moreover, since the value ($G_0 \times G_5$) is calculated on the basis of the design standard value of the gain in the focus servo loop and the gain in the focus servo loop after the AGC automatic adjustment, it is possible to calculate the value ($G_0 \times G_5$) in parallel to the AGC automatic adjustment for the gain to thereby reduce the process time for the whole information reproduction process.

Since only the adjusting amount Δ in the bias voltage is calculated as shown at the step S26, it is possible to simplify the calculating process and also possible to make the calculating process faster, as compared with the case of initially calculating the bias voltage itself.

Further, since a present bias voltage is calculated on the basis of the previously set bias voltage, when calculating the present bias voltage, it is enough to calculate only a changing amount changed from the previous bias voltage. As a result, it is possible to simplify the calculating process of the bias voltage and also possible to make the calculating process faster.

Each time the information is reproduced from the optical disk 1, the bias voltage is updated to thereby improve the accuracy of the bias voltage control.

Further, since, when calculating one bias voltage, the final error amount x is detected by using a sub-error amount at a plurality of different sample positions of the optical disk 1 and also the bias voltage is calculated plural times, the accuracy of the calculated bias voltage can be improved.

The error amount x is calculated by setting the sample number ($N_2$), in the calculation of the bias amount which was finally performed among a plurality of calculations of the bias voltages, larger than the sample number ($N_1$) in the previous calculations of the bias voltages. Thus, this leads up to the improvement of the calculating accuracy for the error amount including the influence of the surface distortion in the optical disk 1. Further, since all the bias voltages are not calculated at the sample number in calculating the final bias voltage, it is possible to improve the calculating accuracy of the bias voltage and also possible to reduce the calculating time.

Incidentally, the case of the focus servo control by means of the astigmatism method is explained in the above mentioned embodiment. However, the present invention is not limited to this case. It can be applied to the focus servo control by means of the so-called Foucault method. In this case, the focus error signal is generated on the basis of output signals from two of two-divided detectors.

The case of performing the calculating process of the bias voltage (the step S12 in FIG. 4) five times is explained in the above mentioned embodiment. However, the present invention is not limited to this case. It is allowable to perform equally to or more than six times or equally to or less than four times.

Further, the case of reproducing the information from the optical disk 1 is explained in the above mentioned embodiment. However, the present invention is not limited to this case. The present invention can be applied to a case of focusing on a guide groove (group) formed in advance on the optical disk 1 to thereby record the information on the optical disk 1.

The invention may be embodied in other specific forms without departing from the spirit or essential characteristics thereof. The present invention embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus for controlling a bias amount of a focus error signal in a focus servo loop of an optical information reproducing and/or recording system, which comprises an optical system for irradiating a light beam to an information record surface of an information record medium and detecting the light beam reflected from the information record surface to output a light detection signal, an amplifying means for amplifying the light detection signal and generating the focus error signal which indicates an error of a focus point of the light beam with respect to the information record surface on the basis of the light detection signal, and a feed back means for feeding back the focus error signal in the focus servo loop to change the focus point with respect to the information record surface in accordance with a level of the focus error signal, said apparatus comprising:

a superimposing means for superimposing a disturbance signal to flutter the focus point with respect to the information record surface, onto the focus error signal;

an error amount detecting means for detecting a focus error amount of the focus point with respect to the information record surface, on the basis of the light detection signal outputted when the disturbance signal is superimposed;

a parameter calculating means for calculating a gain parameter corresponding to an amplification factor of said amplifying means, and a sensitivity parameter corresponding to a detection sensitivity of the optical system; and a bias amount calculating means for calculating the bias amount, on the basis of the detected focus error amount and the calculated gain parameter and sensitivity parameter.

2. An apparatus according to claim 1, wherein said error amount detecting means detects the focus error amount on the basis of an amplitude of the light detection signal outputted when the disturbance signal is superimposed.

3. An apparatus according to claim 1, wherein said gain parameter calculating means calculates a product of the gain parameter and the sensitivity parameter on the basis of an amplitude of the focus error signal in a focus search operation of said optical information reproducing and/or recording system.

4. An apparatus according to claim 1, wherein said parameter calculating means calculates a product of the gain parameter and the sensitivity parameter on the basis of a predetermined design standard value for a gain of the focus servo loop and a gain of the focus servo loop after an automatic gain controlling operation of said optical information reproducing and/or recording system.

5. An apparatus according to claim 1, wherein said bias amount calculating means comprises:

an adjusting amount calculating means for calculating an adjusting amount to adjust the bias amount, on the basis of the detected focus error amount and the calculated gain parameter and sensitivity parameter; and an adding means for adding the calculated adjusting amount to the bias amount before calculating the adjusting amount so as to calculate a new bias amount.

6. An apparatus according to claim 5, further comprising a memory means for storing the calculated bias amount, said adding means adding the calculated adjusting amount to the bias amount stored in said memory means.

7. An apparatus according to claim 1, wherein said bias amount calculating means calculates the bias amount by a plural of times, and said error amount detecting means detects the focus error amount by $N_1$ ($N_1$: natural number not less than 2)

times at a plurality of different positions on the information record surface, calculates the focus error amount to non-finally calculate the bias amount on the basis of the $N_1$ times detected Focus error amounts, detects the focus error amount by $N_2$ ($N_2$: natural number, and $N_1 < N_2$) times at the plurality of different positions and calculates the focus error amount to finally calculate the bias amount on the basis of the $N_2$ times detected focus error amounts.

8. An apparatus according to claim 7, wherein said error amount detecting means calculates the focus error amount to non-finally calculate the bias amount by averaging maximum and minimum values of the $N_1$ times detected focus error amounts, and calculates the focus error amount to finally calculate the bias amount by averaging maximum and minimum values of the $N_2$ times detected focus error amounts.

* * * * *